(12) United States Patent
Puzis et al.

(10) Patent No.: US 11,809,423 B2
(45) Date of Patent: *Nov. 7, 2023

(54) METHOD AND SYSTEM FOR INTERACTIVE KEYWORD OPTIMIZATION FOR OPAQUE SEARCH ENGINES

(71) Applicant: B. G. NEGEV TECHNOLOGIES AND APPLICATIONS LTD., AT BEN-GURION UNIVERSITY, Beer Sheva (IL)

(72) Inventors: Rami Puzis, Ashdod (IL); Aviad Elyashar, Beer Sheva (IL); Maor Reuben, Haifa (IL)

(73) Assignee: G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,917

(22) Filed: Jun. 30, 2022

(65) Prior Publication Data

US 2022/0358122 A1    Nov. 10, 2022

Related U.S. Application Data

(63) Continuation of application No. 16/840,538, filed on Apr. 6, 2020, now Pat. No. 11,397,731.
(Continued)

(51) Int. Cl.
*G06F 16/2453* (2019.01)
*G06F 16/953* (2019.01)

(52) U.S. Cl.
CPC ........ *G06F 16/2453* (2019.01); *G06F 16/953* (2019.01)

(58) Field of Classification Search
CPC .................... G06F 16/2453; G06F 16/953
(Continued)

(56) References Cited

U.S. PATENT DOCUMENTS

| | | | | |
|---|---|---|---|---|
| 6,553,372 B1* | 4/2003 | Brassell | ................ | G06F 16/325 |
| | | | | 707/999.005 |
| 7,401,057 B2* | 7/2008 | Eder | ..................... | G06N 5/022 |
| | | | | 706/20 |

(Continued)

OTHER PUBLICATIONS

Chirita et al., "Personalized query expansion for the web", Proceedings of the 30th annual international ACM SIGIR conference on Research and development in information retrieval, pp. 7-14. ACM, 2007 (8 pages).
(Continued)

*Primary Examiner* — Mark E Hershley
(74) *Attorney, Agent, or Firm* — Roach Brown McCarthy & Gruber, P.C.; Kevin D. McCarthy

(57) ABSTRACT

An automated interactive optimization method of short keyword queries for improving information retrieval from opaque (black box) search engines is disclosed. The method requires collecting data from several fact-checking websites, for creating dataset used for evaluation; estimating the relevance of posts/query results retrieved from a search engine to a given input document, by calculating the mean relevance error (MRE), based on estimating the minimal distance between words comprising both the retrieved posts and the input document; labeling a subset of claims for evaluation, by choosing a number of claims that gained the maximal and the minimal mean relevance error (MRE); and finding the most appropriate queries in order to retrieve the maximal number of relevant posts using an opaque search engine, by performing an interactive greedy search for the
(Continued)

US 11,809,423 B2

Page 2 best word that should be added to the input query, for maximizing the corresponding posts retrieved by the search engine.

8 Claims, 4 Drawing Sheets

Related U.S. Application Data

(60) Provisional application No. 62/830,474, filed on Apr. 7, 2019.

(58) Field of Classification Search
USPC .......................................... 707/706
See application file for complete search history.

(56) References Cited

U.S. PATENT DOCUMENTS

| | | | | |
|---|---|---|---|---|
| 7,668,812 | B1* | 2/2010 | Riley | G06F 16/24573 |
| | | | | 707/754 |
| 8,516,048 | B2* | 8/2013 | Gupta | G06F 16/00 |
| | | | | 709/227 |
| 8,860,717 | B1* | 10/2014 | Zeiger | G06F 3/04847 |
| | | | | 345/419 |
| 8,903,811 | B2* | 12/2014 | Hueter | G06Q 30/0201 |
| | | | | 707/723 |
| 9,002,678 | B1* | 4/2015 | Cheded | G06F 17/18 |
| | | | | 702/183 |
| 9,582,618 | B1* | 2/2017 | Doraiswami | G06F 30/20 |
| 2003/0182274 | A1* | 9/2003 | Oh | G06F 16/954 |
| 2004/0243356 | A1* | 12/2004 | Duffy | G06K 9/00 |
| | | | | 702/189 |
| 2005/0027666 | A1* | 2/2005 | Beck, Jr. | G06Q 30/02 |
| 2006/0064411 | A1* | 3/2006 | Gross | G06F 16/951 |
| 2006/0212413 | A1* | 9/2006 | Rujan | G06F 16/355 |
| | | | | 706/20 |
| 2007/0038600 | A1* | 2/2007 | Guha | G06F 16/951 |
| 2007/0038601 | A1* | 2/2007 | Guha | G06F 16/332 |
| 2007/0092917 | A1* | 4/2007 | Guyon | G01N 33/57434 |
| | | | | 435/7.23 |
| 2008/0077570 | A1* | 3/2008 | Tang | G06F 16/951 |
| | | | | 707/999.005 |
| 2008/0177994 | A1* | 7/2008 | Mayer | G06F 16/00 |
| | | | | 709/224 |
| 2009/0077033 | A1* | 3/2009 | McGary | G06F 16/24578 |
| 2009/0106202 | A1* | 4/2009 | Mizrahi | G06F 16/48 |
| | | | | 707/E17.02 |
| 2010/0088428 | A1* | 4/2010 | Hendrickson | H03M 7/04 |
| | | | | 707/E17.014 |
| 2010/0332431 | A1* | 12/2010 | Ribiere | H04L 67/306 |
| | | | | 706/14 |
| 2011/0093452 | A1* | 4/2011 | Jain | G06F 16/3322 |
| | | | | 707/723 |
| 2013/0238356 | A1* | 9/2013 | Torii | G06Q 10/10 |
| | | | | 705/2 |
| 2014/0075004 | A1* | 3/2014 | Van Dusen | G06Q 50/01 |
| | | | | 709/223 |
| 2014/0079297 | A1* | 3/2014 | Tadayon | G06V 40/172 |
| | | | | 382/118 |
| 2014/0201126 | A1* | 7/2014 | Zadeh | A61B 5/4803 |
| | | | | 706/52 |
| 2014/0280952 | A1* | 9/2014 | Shear | H04L 63/10 |
| | | | | 709/226 |
| 2014/0282586 | A1* | 9/2014 | Shear | H04L 47/70 |
| | | | | 718/104 |
| 2015/0045713 | A1* | 2/2015 | Attalah | G16H 50/50 |
| | | | | 706/21 |
| 2016/0078057 | A1* | 3/2016 | Perez de la Coba | G06T 7/10 |
| | | | | 707/772 |
| 2016/0170814 | A1* | 6/2016 | Li | G06F 9/542 |
| | | | | 719/318 |
| 2016/0180434 | A1* | 6/2016 | Knight | G06F 16/95 |
| | | | | 705/26.63 |
| 2016/0266939 | A1* | 9/2016 | Shear | G06F 9/50 |
| 2016/0357731 | A1* | 12/2016 | Zorzin | G06F 40/232 |
| 2017/0131988 | A1* | 5/2017 | Boudville | H04L 61/35 |
| 2017/0193112 | A1* | 7/2017 | Desineni | G06F 16/951 |
| 2018/0053207 | A1* | 2/2018 | Modani | G06Q 30/0244 |
| 2018/0061459 | A1* | 3/2018 | Song | G06V 10/993 |
| 2018/0165554 | A1* | 6/2018 | Zhang | G06K 9/6269 |
| 2018/0204111 | A1* | 7/2018 | Zadeh | G06N 3/0436 |
| 2018/0349347 | A1* | 12/2018 | Ringger | G06Q 30/0251 |
| 2019/0156253 | A1* | 5/2019 | Malyack | G06N 5/022 |
| 2019/0279102 | A1* | 9/2019 | Cataltepe | G06N 7/00 |
| 2019/0311301 | A1* | 10/2019 | Pyati | G06F 16/901 |
| 2020/0160966 | A1* | 5/2020 | Lyman | G06V 10/764 |
| 2020/0252651 | A1* | 8/2020 | Cohn | H04N 19/174 |

OTHER PUBLICATIONS

Liu et al., "Predicting movie box-office revenues by exploiting large-scale social media content. Multimedia Tools and Applications", 75(3):1509-1528, 2016 (20 pages).

Bernard J Jansen et al., "Micro-blogging as online word of mouth branding". CHI 2009 extended abstracts on human factors in computing systems, pp. 3859-3864.ACM, 2009 (6 pages).

Cronen-Townsend et al., "Predicting query performance", Proceedings of the 25th annual international ACM SIGIR conference on Research and development in information retrieval, pp. 299-306. ACM, 2002 (8 pages).

Koenemann et al., "A case for interaction: A study of interactive information retrieval behavior and effectiveness", Proceeding of the ACM SIGCHI Conference on Human Factors in Computing Systems, pp. 205-212, Citeseer, 1996 (8 pages).

Zhou et al., "Fake news: Fundamental theories, detection strategies and challenges", Proceedings of the Twelfth ACM International Conference on Web Search and Data Mining, pp. 836-837, ACM, 2019 (2 pages).

Tacchini et al., "Some like it hoax: Automated fake news detection in social networks", arXiv preprint arXiv:1704.07506, 2017 (12 pages).

Zhou et al., "Ranking robustness: a novel framework to predict query performance", Proceedings of the 15th ACM International conference on Information and knowledge management, pp. 567-574. ACM, 2006 (8 pages).

Kurland et al., "Back to the roots: A probabilistic framework for query performance prediction", Proceedings of the 21st ACM international conference on Information and knowledge management, pp. 823-832. ACM, 2012 (10 pages).

He et al., "Inferring query performance using pre-retrieval predictors", International symposium on string processing and information retrieval, pp. 43-54. Springer, 2004 (12 pages).

Zhou et al., "Query performance prediction in web search environments", Proceedings of the 30th annual international ACM SIGIR conference on Research and development in information retrieval, pp. 543-550. ACM, 2007 (8 pages).

Kusner et al., "From word embeddings to document distances", International Conference on Machine Learning, pp. 957-966, 2015 (10 pages).

Kenter et al., "Short text similarity with word embeddings", Proceedings of the 24th ACM international on conference on information and knowledge management, pp. 1411-1420. ACM, 2015 (10 pages).

Ellen M Voorhees. "Query expansion using lexical-semantic relations". In Proceedings of the 17th annual international ACM SIGIR conference on Research and development in information retrieval, pp. 61-69. Springer-Verlag New York, Inc., 1994. (10 pages).

Somnath Banerjee et al., "Clustering short texts using wikipedia". In Proceedings of the 30th annual international ACM SIGIR conference on Research and development in information retrieval, pp. 787-788. ACM, 2007. (2 pages).

Pengqi Liu et al., "Automatic keywords generation for contextual advertising". In Proceedings of the 23rd International Conference on World Wide Web, pp. 345-346. ACM, 2014. (2 pages).

(56) References Cited

OTHER PUBLICATIONS

Saar Kuzi et al., "Query expansion using word embeddings". In Proceedings of the 25th ACM international on conference on information and knowledge management, pp. 1929-1932. ACM, 2016. (4 pages).
Mikolov et al., "Advances in pre-training distributed word representations", Proceedings of the International Conference on Language Resources and Evaluation (LREC 2018), 2018 (4 pages).
C. Zhang, "Automatic keyword extraction from documents using conditional random fields". Journal of Computational Information Systems 4 (3) (2008) 1169-1180. (11 pages).
Y. Elovici et al., "Ethical considerations when employing fake identities in online social networks for research". Science and engineering ethics 20 (4) (2014) 1027-1043 (17 pages).
Piotr Bojanowski et al., "Enriching word vectors with subword information". arXiv preprintarXiv:1607.04606, 2016. (13 pages).
Christina Boididou et al. "Verifying multimedia use at mediaeval 2016". In MediaEval, 2016 (4 pages).
Tomas Mikolov et al., "Efficient estimation of word representations in vector space". arXiv preprint arXiv:1301.3781, 2013. (12 pages).
Jeffrey Pennington et al., "Glove: Global vectors for word representation". In Proceedings of the 2014 conference on empirical methods in natural language processing (EMNLP), pp. 1532-1543, 2014 (12 pages).
Kai Shu et al., "Understanding user profiles on social media for fake news detection". In 2018 IEEE Conference on Multimedia Information Processing and Retrieval (MIPR), pp. 430-435. IEEE, 2018. (6 pages).
Svitlana Volkova et al., "Separating facts from fiction: Linguistic models to classify suspicious and trusted news posts on twitter". In Proceedings of the 55th Annual Meeting of the Association for Computational Linguistics (vol. 2: Short Papers), vol. 2, pp. 647-653, 2017 (7 pages).
Wu, P. et al., (Apr. 2006). Query selection techniques for efficient crawling of structured web sources. In 22nd International Conference on Data Engineering (ICDE'06) (pp. 47-47). IEEE. (10 pages).
Xu, B. et al., (2018) "Improving pseudo-relevance feedback with neural network-based word representations". IEEE Access, 6, 62152-62165. (14 pages).
Pang, W., & Du, J. (2019). "Query Expansion and Query Fuzzy with Large-Scale Click-through Data for Microblog Retrieval". International Journal of Machine Learning and Computing, 9(3). (9 pages).
Li, C. (Jul. 2014). "Req-rec: High recall retrieval with query pooling and interactive classification". In Proceedings of the 37th international ACM SIGIR conference on Research & development in information retrieval (pp. 163-172). (10 pages).
Makki, R. et al., (2018) "ATR-Vis: Visual and interactive information retrieval for parliamentary discussions in twitter". ACM Transactions on Knowledge Discovery from Data (TKDD), 12(1), 1-33. (33 pages).
Zamani, H. et al., (Oct. 2016). "Pseudo-relevance feedback based on matrix factorization". In Proceedings of the 25th ACM international on conference on information and knowledge management (pp. 1483-1492). (10 pages).
Al-Khateeb (Mar. 2017). "Query reformulation using WordNet and genetic algorithm". In 2017 Annual Conference on New Trends in Information & Communications Technology Applications (NTICT) (pp. 91-96). IEEE. (6 pages).
Nogueira, R., & Cho, K. (2017). "Task-oriented query reformulation with reinforcement learning". arXiv preprint arXiv:1704.04572. (10 pages).
Chy, A. et al., (2019). Query Expansion for Microblog Retrieval Focusing on an Ensemble of Features. Journal of Information Processing, 27, 61-76. (16 pages).
Albishre, K. (Jan. 2017). "Effective pseudo-relevance for microblog retrieval". In Proceedings of the Australasian Computer Science Week Multiconference (pp. 1-6). (6 pages).
Jun Wang et al., "Improving short text clustering performance with keyword expansion". In The Sixth International Symposium on Neural Networks (ISNN 2009), pp. 291-298. Springer, 2009 (877 pages).

\* cited by examiner

METHOD AND SYSTEM FOR INTERACTIVE KEYWORD OPTIMIZATION FOR OPAQUE SEARCH ENGINES

FIELD OF THE INVENTION

The present invention relates to the field of data search engines. More particularly, the present invention relates to a method and system for interactive keyword optimization for opaque search engines.

BACKGROUND OF THE INVENTION

Short keyword queries are one of the main milestones of any user or bot seeking information through the ubiquitous search engines available on the Web [Chirita et al., "Personalized query expansion for the web", Proceedings of the 30th annual international ACM SIGIR conference on Research and development in information retrieval, pages 7-14. ACM, 2007]. Automated Keyword optimization mostly relies on the analysis of data repositories for a small set of keywords that identify the discussed topic and relevant documents. However, most search engines are available today on the Web are opaque, providing little to no information about their operation methods and the searched repository.

Searching (retrieving posts) within Online Social Media (OSM) can help with box office revenues prediction [Liu et al., "Predicting movie box-office revenues by exploiting large-scale social media content. Multimedia Tools and Applications", 75(3):1509-1528, 2016], product reviews [Jansen et al., 2009], and many other problems, where the intelligence of the crowd can be utilized. However, in many cases, the ambiguity of short keyword queries causes poor performance [Cronen-Townsend et al., "Predicting query performance", Proceedings of the 25th annual international ACM SIGIR conference on Research and development in information retrieval, pages 299-306. ACM, 2002].

The problem of ambiguity is more emphasized when working with opaque ("black box") search engines. In contrast to transparent search engines, where the repository and the algorithms are visible to the query writer, opaque search engines provide a very limited level of interactivity and hide all activities that the search engine performs, including the repository itself [Koenemann et al., "A case for interaction: A study of interactive information retrieval behavior and effectiveness", Proceeding of the ACM SIGCHI Conference on Human Factors in Computing Systems, pages 205-212, Citeseer, 1996]. Nowadays, most conventional search engines, including OSM, are opaque.

In recent years, one of the OSM search use cases is related to fake news. There is a huge growth of fake news, disinformation, and propaganda within the OSM, leading to the erosion of public trust in media outlets and OSM [Zhou et al., "Fake news: Fundamental theories, detection strategies and challenges", Proceedings of the Twelfth ACM International Conference on Web Search and Data Mining, pages 836-837, ACM, 2019]. Some methods for locating posts related to falsehood or truth disseminated through OSM include tracking specific sources, the behavior of which is extreme to either end [Tacchini et al., "Some like it hoax: Automated fake news detection in social networks", arXiv preprint arXiv:1704.07506, 2017]. Several researchers suggest investigating and determining the trustworthiness of a Claim made in public media by looking into online discussions extracted from the OSM platforms.

Such investigations require collecting posts associated with (presumably fake) claims that appear in news articles. In all these methods, the set of keywords for querying the OSM are defined manually for each and every Claim. Determining search keywords manually, significantly limits the number of Claims that can be processed using the techniques described above.

Query Performance Prediction

Query performance prediction (QPP) is used mainly for information retrieval domain [Zhou et al., "Ranking robustness: a novel framework to predict query performance", Proceedings of the 15th ACM international conference on Information and knowledge management, pages 567-574. ACM, 2006] by estimating the relevance of retrieved documents to a query when no previous knowledge about the documents exists [Kurland et al., "Back to the roots: A probabilistic framework for query performance prediction", Proceedings of the 21st ACM international conference on Information and knowledge management, pages 823-832. ACM, 2012].

The QPP task can be divided into two sub domains: pre-retrieval and post-retrieval prediction. In the first domain, researchers attempt to predict query performance based on data that does not contain the retrieved documents [He et al., "Inferring query performance using pre-retrieval predictors", International symposium on string processing and information retrieval, pages 43-54. Springer, 2004].

In the post-retrieval prediction domain, the task is to predict query performance using the retrieved documents from the query [Kurland et al., 2012]. There are few well-known measures used for evaluating the performance of post-retrieval prediction methods, such as Clarity [Cronen-Townsend et al., "Predicting query performance", Proceedings of the 25th annual international ACM SIGIR conference on Research and development in information retrieval, pages 299-306. ACM, 2002.], and WIG [Zhou et al., "Query performance prediction in web search environments", Proceedings of the 30th annual international ACM SIGIR conference on Research and development in information retrieval, pages 543-550. ACM, 2007].

Document Similarity

Studies in this domain evaluate the semantic similarity between two given documents. Several methods used word vector representation for this problem [Kusner et al., "From word embeddings to document distances", International Conference on Machine Learning, pages 957-966, 2015] calculated the minimal distance between each word in one text to all the words in the other. Kenter et al., ["Short text similarity with word embeddings", Proceedings of the 24th ACM international on conference on information and knowledge management, pages 1411-1420. ACM, 2015] also used these vectors for calculating the distances between words of documents. Based on these distances it can be determined whether the documents are similar or not.

Keyword Expansion

In the last decades, the ambiguity of short keyword queries aroused the need for improved solutions for Web retrieval task [Chirita et al., 2007]. One of the common methods for keyword expansion takes given keywords and adds more related words to the keywords for better representation. [Wang et al., 2009; Voorhees, 1994] added synonyms from Word-Net (https://wordnet.princeton.edu/ https://wordnet.princeton.edu/) for improving keyword representation over the text. [Banerjee et al., 2007] showed that Wikipedia can be a source for keywords expansion. [Liu et al., 2014] presented a novel part of speech (POS) patterns that can be used for choosing candidate keywords. Similarly,

[Wang et al., 2009] used TF-IDF measure for keywords expansion, only by choosing the K best terms based on the TF-IDF score. The present invention method chooses the POS tagging and TF-IDF keywords expansion methods as the baseline for the proposed method. [Kuzi et al., 2016; Roy et al., 2016] proposed a method for choosing a term for query expansion using word embedding representation of terms. Their idea is to choose terms that yield the highest probability for being related to the current query.

It is therefore an object of the present invention to provide a method and system for interactive keyword optimization for opaque search engines, for improving information retrieval from opaque search engines.

Other objects and advantages of the invention will become apparent as the description proceeds.

SUMMARY OF THE INVENTION

An automated interactive optimization method of short keyword queries for improving information retrieval from opaque (black box) search engines, comprising the steps of:
- a) collecting data including labeled claims from several fact-checking websites, for creating dataset which is used for evaluation;
- b) estimating the relevance of posts/query results retrieved from a search engine to a given input document, by calculating the mean relevance error (MRE), based on estimating the minimal distance between words comprising both the retrieved posts and the input document;
- c) labeling a subset of claims for evaluation, by choosing a number of claims that gained the maximal and the minimal mean relevance error (MRE); and
- d) finding the most appropriate keywords in order to retrieve the maximal number of relevant posts using an opaque search engine, by performing an interactive greedy search for the best word that should be added to the input query, for maximizing the corresponding posts retrieved by the search engine.

Calculating the mean relevance error (MRE) may be performed by estimating the minimal distance between vector representations of words in a retrieved post and the words in the given input document, including the following steps:
- a) removing stop-words from the input document and the retrieved posts;
- b) defining the mean relevance error (MRE) as a function, which receives as an input a document d and a collection of posts P retrieved from the search engine and outputs a number, where the lower the MRE, the more relevant are the retrieved posts P to the underlined document d;
- c) calculating the Euclidean distance between vector representations of two words as a measure of similarity between them, wherein vector representations of words are derived using a word embedding model;
- d) defining the distance between a word $w_i$ and a document d as the minimal distance between a word $w_i$ and all the words in the set of words in the input document d, defined as $W_d$;
- e) averaging the distances of all words $w_i \in W_p$, which defines as the set pf words in p∈P, to the document d, for calculating the distance of a post p from document d; and
- f) defining the mean relevance error (MRE) of the collection P to the document d as the average distance of all posts in P from document d and calculating said MRE.

The MRE may be adapted to measure only one aspect of query performance, for representing the relevance of the results.

Each claim may include one or more of the following descriptive attributes:
- title;
- description;
- verdict date;
- a link to the analysis report of a fact checker and verdict, being the true label.

The labeling process may include the following steps:
- a) using annotators that are required to read the claim's title and description and the retrieved posts associated with said title;
- b) labeling each post by each annotator with one of the optional labels: Relevant in case of the given post is associated to the given claim, Irrelevant in case of the given post is not associated to the given claim, and Unknown in case the annotator is not sure whether the tweet is related or not; and
- c) using only the posts that the majority among the annotators agreed on.

The interactive greedy search process may include the following steps:
- a) splitting the given document's text into a set of words and removing stop words;
- b) at the first iteration, starting from queries with a single word, sending each query to the opaque search engine and receiving posts as a response;
- c) receiving for each keyword an aggregated mean relevance error (MRE), which reflects the relevance of the retrieved collection of posts to the given document;
- d) adding the keyword that its MRE improves the retrieved results, wherein the process is finished in case the error is not increased, or in case the query includes all the document's key-words; and
- e) returning and implementing the algorithm on the query that yields the best MRE.

Every other score can be used as an optional relevance measure, instead of MRE.

A system for automated interactive keyword optimization for opaque search engines, comprising:
- a) A database for storing data for evaluation, including labeled claims collected from several fact-checking websites;
- b) At least one processor adapted to:
  - b.1) estimate the relevance of posts/query results retrieved from a search engine to a given input document, by calculating the mean relevance error (MRE), based on estimating the minimal distance between words comprising both the retrieved posts and the input document;
  - b.2) label a subset of claims for evaluation, by choosing a number of claims that gained the maximal and the minimal mean relevance error (MRE); and
  - B.3) find the most appropriate keywords in order to retrieve the maximal number of relevant posts using an opaque search engine, by performing an interactive greedy search for the best word that should be added to the input query, for maximizing the corresponding posts retrieved by the search engine.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
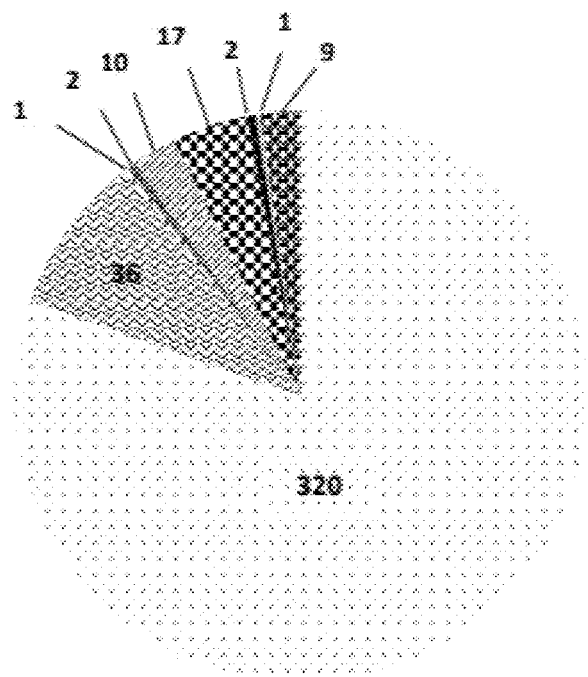
FIG. 1 shows a pie graph with Website Distribution.

The present invention provides an automated interactive optimization method of short keyword queries in order to improve information retrieval from opaque ("black box") search engines. The task for which the present invention is directed may be for example, the retrieval of relevant posts from an online social media (OSM) given a news article or a document being discussed online (referred to as a "claim").

The proposed algorithm iteratively selects keywords while querying the search engine and comparing a small set of retrieved posts to the given news article through a mean relevance error based on word embedding. The proposed algorithm is being demonstrated while building a Fake News data set from claims (collected from fact-checking websites) and their tweets. The mean relevance error found to be accurate for differentiating between relevant and irrelevant posts (0.9 Area Under the Curve (AUC)). The optimized queries produce similar results to manually extracted keywords outperforming Term Frequency-Inverse Document Frequency (TF-IDF is a numerical statistic that is intended to reflect how important a word is to a document in a collection or corpus) based methods and POS tagging (the process of marking up a word in a text (corpus) as corresponding to a particular part of speech).

The proposed solution is two-fold: (1) The relevance of posts to the claim is estimated by comparing the vector representations of words contained in both documents; (2) A greedy algorithm is used to build the set of keywords for the above task by iteratively querying the OSM for the first page or relevant posts and choosing the best keyword to add to the set.

The proposed method has demonstrated on Twitter presenting a Fake News dataset of 398 claims collected from fact-checking websites, as well as word embedding of 1,186,334 posts relevant to those claims. 1,078 of the posts were manually classified as relevant or irrelevant to a given claim.

The present invention proposes a novel interactive method for optimizing keyword extraction given a document while querying a search engine. This is done by evaluating the similarity between a given claim (document) to a collection of posts (documents) associated with the given claim. The proposed method includes two complementing steps:

The first step is finding the mean relevance error, a short-document comparison method for determining the relevance of query results to a given document based on estimating the minimal distance between words comprising both the retrieved posts and the input document.

The second step is a novel interactive greedy search for finding the most appropriate keywords in order to retrieve the maximal number of relevant posts using an opaque search engine. Since there is no knowledge about the inner mechanisms of the search engine and the data stored there, a series of limited interactions were performed with the search engine in order to optimize the set of keywords comprising the query. In every step of the greedy search, the next best keyword to add to the query has been chosen. The quality of the incumbent queries is computed on a few of the top results using the proposed mean relevance error (MRE).

Mean Relevance Error (MRE)

The present invention proposes a method for estimating the relevance of posts retrieved from a search engine to a given input document. The method estimates the minimal distance between vector representations of words in a retrieved post and the words in the given input document.

At the first stage, stop-words are being removed from the document and the retrieved posts. The mean relevance error (MRE) is defined as a function, which receives as an input a document d and a collection of posts P retrieved from the search engine and outputs a number. The lower the MRE is, the more relevant are the retrieved posts P to the underlined document d.

$W_p = \{w_1, w_2, \ldots, w_k\}$ is the set of words in $p \in P$ and $W_d = \{w_1, w_2, \ldots, w_l\}$ denotes the set of words in the input document d. Since the important aspect is the retrieval of microblog posts which are relevant to some online discussion (such as a news article), it is assumed that $l \gg k$. The Euclidean distance between vector representations of two words is used as a measure of similarity between them, denoted by $dist(w_i, w_j)$. Vector representations of words can be derived using any word embedding model, such as GloVe [Pennington et al., "Glove: Global vectors for word representation", Proceedings of the 2014 conference on empirical methods in natural language processing (EMNLP), pages 1532-1543, 2014], Word2vec [Mikolov et al., "Efficient estimation of word representations in vector space", arXiv preprint arXiv:1301.3781, 2013], fastText [Bojanowski et al., "Enriching word vectors with subword information", arXiv preprint arXiv:1607.04606, 2016], etc. The distance between a word $w_i$ and a document d is the minimal distance between the word $w_i$ and all the words in $w_d$.

$$dist(w_i, d) = \min_{w_j \in W_d} \{dist(w_i, w_j)\}$$

At the next stage, in order to calculate the distance of a post p from a document d, the distances of all words $W_i \in W_P$ to the document d are averaged:

$$dist(p, d) = \frac{1}{k} \sum_{w_i \in W_p} dist(w_i, W_d)$$

At the next stage, given a collection of posts P the mean relevance error (MRE) of the collection P to the document d was defined as the average distance of all posts in P from d:

$$MRE(P, d) = \frac{1}{|P|} \sum_{p \in P} dist(p, d)$$

The MRE defined above is designed to measure only one aspect of query performance, namely the relevance of the results. Other important aspects, such as the number of results are intentionally not captured by MRE. The quality of MRE is affected by the quality of the underlying word embedding model. For general purpose query evaluation, it is recommended to use word embedding models trained globally on large data sets.

Keyword Optimization

The present invention proposes a novel automatic method for finding the most appropriate keywords in order to retrieve the maximal number of relevant documents using an opaque search engine. The proposed method is based on an interactive greedy search for the best word that should be added to the input query in order to maximize the corresponding posts retrieved by the search engine.

Bottom-Up Search

First, the given document's text is split into a set of words and stop words are removed. In the first iteration, the process starts from queries with a single word. Each query is sent to the opaque search engine and posts are being received as a response. Each keyword receives an aggregated mean relevance error (MRE), which reflects the relevance of the retrieved collection of posts to the given document. At the end of the iteration, the keyword that its MRE improves the retrieved results is add. The process is finished in case the error is not increased, or in case the query includes all the document's key-words. The algorithm returns the query that yields the best MRE (as shown in Algorithm 1 below).

```
Algorithm 1 Bottom Up Search

1:   procedure BOTTOM-UP (DOCUMENT, MINPOSTS)
2:       WalkedQueryList ← [ ]
3:       baseQuery ← ""
4:       keywords ← set(splitToKeywords(document))
5:       se = SearchEngine
6:       while keywords.size > 0 do
7:           query ← baseQuery
8:           bestWord ← ""
9:           bestRelevance ← ∞
10:          for all keyword ∈ keywords do
11:              query.add(keyword)
12:              posts ← se.getPosts(keyword)
13:              MRE ← calculateRelevance(document,posts)
14:              if posts.size( )> minPosts then
15:                  WalkedQueryList.add(query,MRE)
16:              if MRE < bestRelevance then
17:                  bestRelevance ← MRE
18:                  bestWord ← keyword
19:              baseQuery.add(bestWord)
20:              keywords.remove(bestWord)
21:          bestQuery ← MinMRE(WalkedQueryList)
             return bestQuery
```

The present invention suggests and evaluates the proposed MRE. However, every other score can be suggested as an optional relevance measure.

The Dataset Used for the Evaluation Process 398 labeled claims were collected from several fact-checking websites, mostly from Snopes (https://www.snopes.com/). FIG. 1 shows a pie graph with Website Distribution. These claims were collected manually from July until December 2018. The claims were published from June 1997 to December 2018. Each claim includes descriptive attributes, such as title, description, verdict date (the date in which a fact checker published the claim), a link to the analysis report of a fact checker, and verdict (the true label).

Twitter search engine was used in order to collect tweets that are relevant to these claims. Twitter is one of the biggest and popular online social networks worldwide with more than 321 million monthly active users worldwide as of the fourth quarter of 2018 [twi,]. In total, 1,186,334 tweets published by 772,940 users were retrieved. An average of 2,981 posts per claim. All the tweets were published from April 2007 until February 2019. These tweets were crawled by four different methods: the proposed Bottom-Up greedy search (280,261 tweets), key-words defined manually (75,263 tweets), TF-IDF (423,868 tweets), and part of speech (POS) tagging (489,598 tweets).

Figure 2:
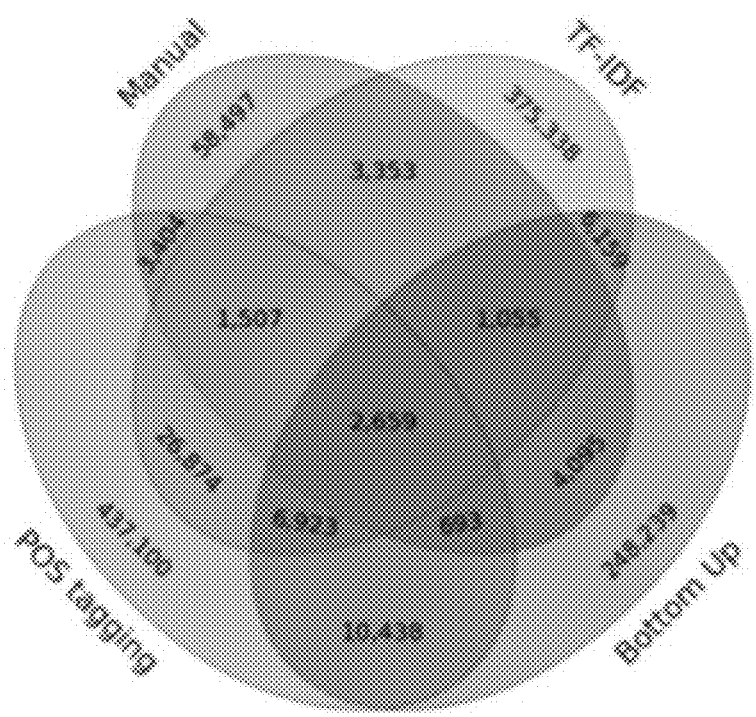
FIG. 2 shows a graph of the number of retrieved tweets by keyword extraction methods.

FIG. 2 shows a graph of the number of retrieved tweets by keyword extraction methods. For the keywords defined manually, TF-IDF and POS tagging methods, tweets were collected by querying a different number of unique words (from one to ten).

Figure 3:
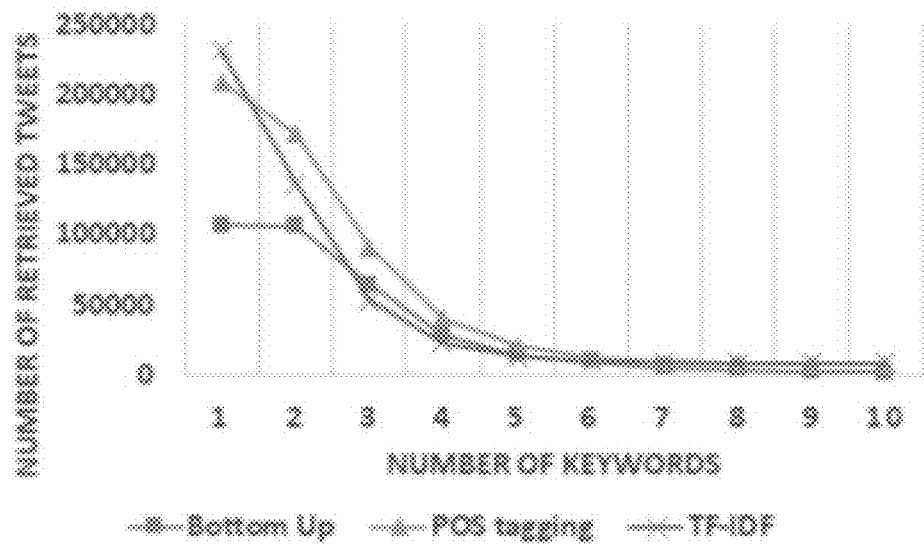
FIG. 3 shows a graph of the number of retrieved tweets per number of keywords in a given query.

FIG. 3 shows a graph of the number of retrieved tweets per number of keywords in a given query.

Manual Labeling of Tweet Relevance

After retrieving tweets according to a few keyword suggestions, a subset of claims was labeled for evaluation. Twenty claims that gained the maximal and the minimal mean relevance error were chosen. In total, for the twenty claims, 1,173 related tweets were collected. For the labeling process, three annotators (students) were used, which were required to read the claim's title and description and the retrieved tweets associated with it. Each annotator labeled each tweet with one of the optional labels: Relevant in case of the given tweet is associated to the given claim, Irrelevant in the opposite case, and Unknown in case the annotator is not sure whether the tweet is related or not. Among the 1,173 retrieved tweets, only the tweets that the majority among the annotators agreed on were used (1,078 tweets). Table 1 below shows an example of a claim, relevant and irrelevant tweets.

TABLE 1

| Example for labeling tweets associated to a given online discussion | |
|---|---|
| Claim | "The rapper DMX (Earl Simmons) dies in February 2018. (Fake) |
| Relevant Tweet | "Juan is just think DMX died so good time!" |
| Irrelevant Tweet | "I likes a @ YouTube . . . video DMX - I Just Died in your arms Tonight. [Remix]" |

Mean Relevance Error

In order to evaluate the proposed method, the following experimental setup was defined: For word embedding, the word vectors representations were delivered by a pre-trained word embedding model of fastText [Mikolov et al., "Advances in pre-training distributed word representations", Proceedings of the International Conference on Language Resources and Evaluation (LREC 2018), 2018]. The model was trained on Common Crawl (http://commoncrawl.org/) and Wikipedia (https://www.wikipedia.org/) using fastText library (https://fasttext.cc/). For the distance measure, the simple Euclidean distance was used.

Figure 4:
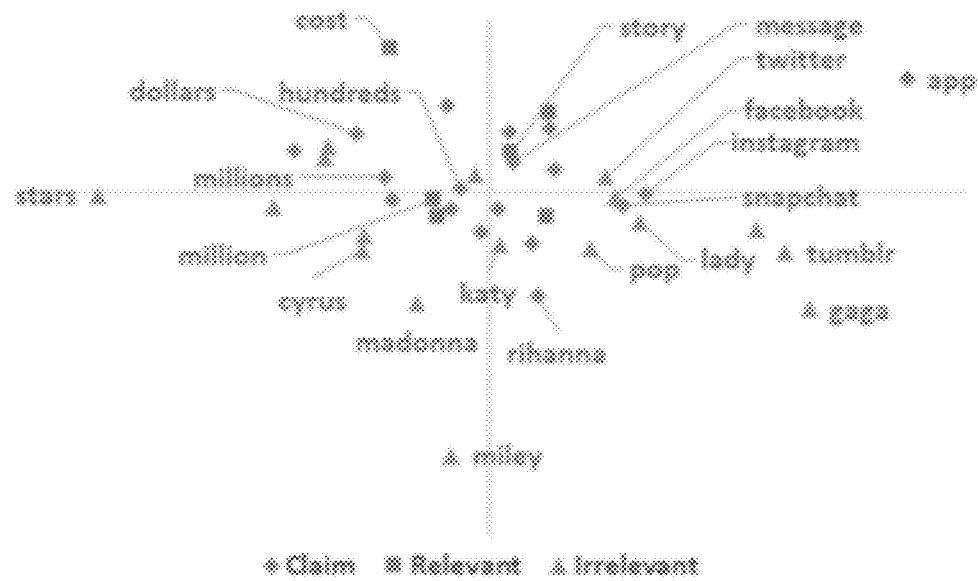
FIG. 4 shows a graph of a claim, relevant tweet, and irrelevant tweet embedded in 2D space.

The proposed mean relevance error was evaluated on the Fake News data set, which includes the claims and the labeled tweets (except from the unknown tweets). The minimal distance for each tweet from the given claim was calculated. A full demonstration of the proposed method is presented in the next example. For the given claim: "Rihanna's Instagram message to followers to throw away the Snapchat app caused the company's share value to fall by hundreds of millions of dollars in one day.". Tweet A includes the next text: "Rihanna Might Have Just Cost Snapchat $600 Million With a Single Instagram Story". Tweet B includes the text: "Legends And Pop Stars As Social Media Lady Gaga Is Twitter Madonna Is Vine Rihanna Is Instagram Katy Perry Is Tumblr Cher Is Facebook Miley Cyrus Is Snapchat". Tweet A was labeled as relevant, whereas Tweet B as irrelevant. Stop words were removed and the MRE was calculated for both tweets. Tweet A got an error of 0.948, as opposed to Tweet B, which reached 1.177. One can notice that according to the proposed distance-based method, the words in Tweet A are closer to the words in the claim, than are the words in Tweet B. For example, words compose Tweet B: "gaga", "miley", "starts" are far from the claim's words, in contrast to the words compose the relevant Tweet A, such as "story" that is placed next to "message", or "millions" that are close to "hundreds". FIG. 4 shows a graph of a claim, relevant tweet, and irrelevant tweet embedded in 2D space.

It can be seen that the semantics of words according to the word embedding is preserved (e.g., the words that represent OSM platforms, such as "twitter", "Facebook", "Instagram", and "snapchat" are very close to each other). Generally, the lower the MRE, the higher the probability for the retrieved tweet to be relevant to the given claim.

An area has been generated under the receiver Operating Characteristic Curve (AUC) based on the relevant and irrelevant tweets. It can be noticed that an AUC of 0.9 was reached, which is based on 1,078 labeled tweets related to twenty claims.

Figure 5:
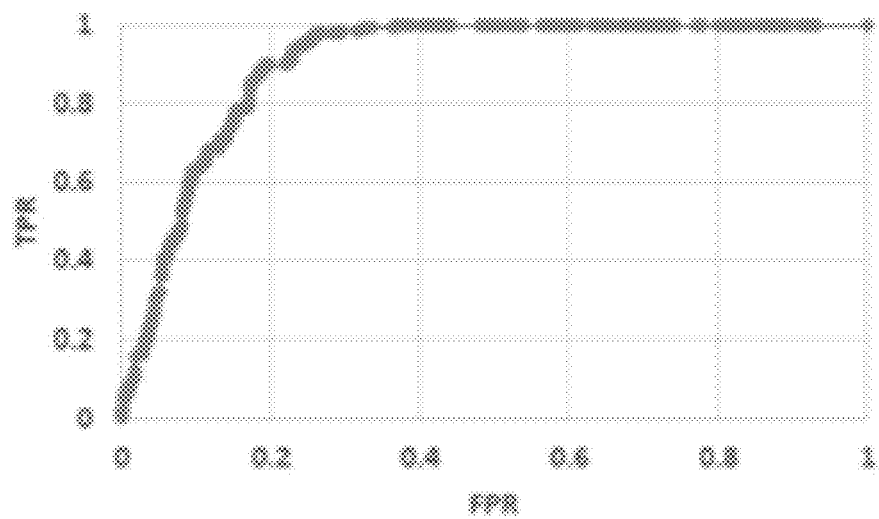
FIG. 5 shows a graph of ROC of the proposed measure on 1078 labeled posts.

FIG. 5 shows a graph of ROC of the proposed measure on 1078 labeled posts. Therefore, one can conclude that the proposed MRE is found very useful for differentiating between relevant and irrelevant posts associated with a given claim.

Keyword Optimization

In order to evaluate the proposed method, the results have been compared with three baseline methods for keyword selection: Keywords defined manually, TF-IDF, and POS tagging.

Keywords Defined Manually

One of the methods used for collecting online discussions related to a given claim was a manual selection of high-quality keywords.

At the first step, the user is required to read the given claim in order to understand the subject of the claim. At the next step, the user should assign keywords, which can express the meaning of the given claim. The method proposed by present invention starts by removing stop words. Similar to [Zhang, 2008], the present invention extracts 3-5 keywords from the title and description of a given claim. At the next step, in many cases, annotators use synonyms in order to expand the context of the retrieved posts written differently but convey the same message [Voorhees, 1994]. The user is also required to use synonyms in order to retrieve a high number of posts relevant to the given claim. For example, for the claim: "Did Donald Trump Scare a Group of Schoolchildren?", there are several synonyms that can use: Donald Trump-President of U.S., scare-frighten, schoolchildren-youngsters, etc. Four, after determine assigned keywords, the user should run them manually as a query for the search engine. The user should watch the corresponding posts and read a few of them in order to understand whether they are relevant to the given claim. The number of retrieved posts is important. In case there are a few tens of posts, it can be a good intuition to use more synonyms as keywords, as shown at Algorithm 2 below.

| Algorithm 2 Manual Keyword Assignment |
|---|
| 1: Read Claim's title and description |
| 2:   If it is necessary, read the full report |
| 3: Assign keywords that express the meaning of the claim. |
| 4: Provide 305 alternative sets of keywords |
| 5:   Use synonyms |
| 6: Query the OSM using the different sets of keywords |
| 7:   Read a few of the retrieved posts. |
| 8:   Check relevance. |
| 9:   Record the number of retrieved posts. |

TF-IDF Keyword Generator

The text that exists in the claims has been used as the targeted corpus. In addition, stop words were removed and computed the TF-IDF score for each word. For each claim, the K words with the highest TF-IDF score were picked, where K is the number of required words.

POS Tagging Keyword Generator

A part of speech (POS) tagging has been used for generating keywords for each given claim. According to this method, the text has been narrowed down to the following candidates: nouns, adjectives, adverbs, and numbers, based on the heuristics suggested by [Liu et al., 2014]. The words were prioritized by their POS tagging as follows:

$$number \leq adverb \leq adjective \leq noun$$

The next step was picking the K first words from the candidates as input keywords. TF-IDF and POS tagging keywords were generated with a fixed size of one to ten words. The keywords defined manually were created using the news article's title and description. Then, the keywords were used to query Twitter for collecting the top 600 posts and the MRE was computed on the received posts for each claim and keyword expansion method. It can be seen that there is a trade-off between the number of posts retrieved per claim and their relevance. Longer queries are less beneficial than shorter queries due to the low number of retrieved posts [Voorhees, 1994]. However, the proposed Bottom Up search outperforms the automatic baseline methods (TF-IDF and POS tagging) and performed similarly to non-automatic keywords defined manually.

Figure 6:
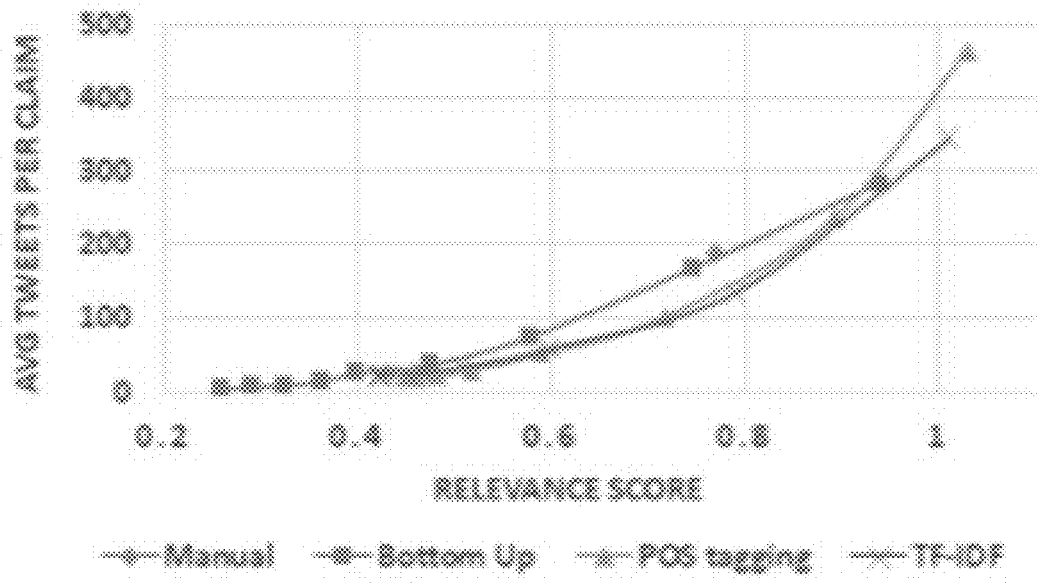
FIG. 6 shows a graph of average tweets per claim versus mean relevance error of TF-IDF keywords generator, POS tagging keywords generator, and our proposed Bottom-Up search. The left dots of TF-IDF and POS tagging are keywords with ten words and the right dots are keywords with one word.

FIG. 6 shows a graph of average tweets per claim versus mean relevance error of TF-IDF keywords generator, POS tagging keywords generator, and the proposed Bottom-Up search. The left dots of TF-IDF and POS tagging are keywords with ten words and the right dots are keywords with one word. It received more relevant posts, comparing to the average posts received by TF-IDF and POS tagging.

For minimizing the potential risks that may arise from activities like collecting information from OSM, the present invention follows recommendations presented by [Elovici et al., 2014], which deal with ethical challenges regarding OSM and Internet communities. Given news article, the present invention proposes a method which suggests the optimal keywords for retrieving the maximal number of relevant documents. To evaluate the proposed method, the Twitter search engine has been used in order to retrieve tweets associated with the given news article.

The present invention proposed a novel automatic interactive method in order to improve information retrieval from opaque search engines. This method is focused on the task of retrieval of relevant posts from Twitter OSM platform given a news article. For this purpose, the mean relevance error has been proposed, which estimates the relevance of posts to a given news article based on the mean distance between vector representations of the article words and the post words. This estimation based on word embedding was found to be accurate for distinguishing between relevant and irrelevant posts. It can be very helpful for collecting relevant posts associated with a given claim automatically. For example, the proposed Bottom-Up greedy algorithm attempts to construct a set of keywords by adding a keyword that improves the relevance of the retrieved posts in each iteration.

This algorithm was found to perform better than baseline methods, such as TF-IDF and POS tagging. The performance of the automatic Bottom-Up method was very similar to the keywords defined manually.

The collected Fake News data set (claims and tweets) has been presented for evaluation, as well as guidelines for manual labeling of tweets. The guidelines for manual keyword assignment were also presented.

The invention claimed is:

1. An automated interactive optimization method of short keyword queries for improving information retrieval from opaque (black box) search engines, comprising:
   a) collecting data including labeled claims from several fact-checking websites, for creating dataset which is used for evaluation;
   b) estimating the relevance of posts/query results retrieved from a search engine to a given input document, by calculating the mean relevance error (MRE), based on estimating the minimal distance between words comprising both the retrieved posts and the input document;
   c) labeling a subset of claims for evaluation, by choosing a number of claims that gained the maximal and the minimal mean relevance error (MRE); and
   d) finding the most appropriate queries in order to retrieve the maximal number of relevant posts using an opaque search engine, by performing an interactive greedy search for the best word that should be added to the input query, for maximizing the corresponding posts retrieved by the search engine;
   wherein calculating the mean relevance error (MRE) is performed by estimating the minimal distance between vector representations of words in a retrieved post and the words in the given input document, including the following steps:
   e) removing stop-words from the input document and the retrieved posts;
   f) defining the mean relevance error (MRE) as a function, which receives as an input a document d and a collection of posts P retrieved from the search engine and outputs a number, where the lower the MRE, the more relevant are the retrieved posts P to the underlined document d;
   g) calculating the distance between vector representations of two words as a measure of similarity between them, wherein vector representations of words are derived using a word embedding model;
   h) defining the distance between a word $w_i$ and a document d as the minimal distance between a word $w_i$ and all the words in the set of words in the input document d, defined as $W_d$;
   i) averaging the distances of all words $w_i \in W_p$, which defines as the set of words in $p \in P$, to the document d, for calculating the distance of a post p from document d; and
   j) defining the mean relevance error (MRE) of the collection P to the document d as the average distance of all posts in P from document d and calculating said MRE.

2. The method according to claim 1, wherein the MRE is used as a measure of relevance.

3. The method according to claim 1, wherein each claim includes one or more of the following descriptive attributes:
   title;
   description;
   verdict date; and
   a link to the analysis report of a fact checker and verdict, being the true label.

4. The method according to claim 1, wherein the labeling process includes the following steps:
   a) using annotators that are required to read the claim's title and description and the retrieved posts associated with said title;
   b) labeling each post by each annotator as one of relevant, irrelevant or unknown labels: Relevant in case of the given post is associated to the given claim, Irrelevant in case of the given post is not associated to the given claim, and Unknown in case the annotator is not sure whether the tweet is related or not; and
   c) using only the posts that the majority among the annotators agreed on.

5. The method according to claim 1, wherein a score, being different from MRE, is used as a relevance measure, instead of MRE.

6. A system for automated interactive keyword optimization for opaque search engines, comprising:
   a) a database for storing data for evaluation, including labeled claims collected from several fact-checking websites;
   b) at least one processor, adapted to:
      b.1) estimate the relevance of posts/query results retrieved from a search engine to a given input document, by calculating the mean relevance error (MRE), based on estimating the minimal distance between words comprising both the retrieved posts and the input document;
      b.2) label a subset of claims for evaluation, by choosing a number of claims that gained the maximal and the minimal mean relevance error (MRE); and
      b.3) find the most appropriate queries in order to retrieve the maximal number of relevant posts using an opaque search engine, by performing an interactive greedy search for the best word that should be added to the input query, for maximizing the corresponding posts retrieved by the search engine;
   wherein calculating the mean relevance error (MRE) is performed by estimating the minimal distance between vector representations of words in a retrieved post and the words in the given input document, including the following steps:
   c) removing stop-words from the input document and the retrieved posts;
   d) defining the mean relevance error (MRE) as a function, which receives as an input a document d and a collection of posts P retrieved from the search engine and outputs a number, where the lower the MRE, the more relevant are the retrieved posts P to the underlined document d;
   e) calculating the distance between vector representations of two words as a measure of similarity between them, wherein vector representations of words are derived using a word embedding model;

f) defining the distance between a word $w_i$ and a document d as the minimal distance between a word $w_i$ and all the words in the set of words in the input document d, defined as $W_d$;

g) averaging the distances of all words $w_i \in W_p$, which defines as the set pf words in $p \in P$, to the document d, for calculating the distance of a post p from document d; and h) defining the mean relevance error (MRE) of the collection P to the document d as the average distance of all posts in P from document d and calculating said MRE.

7. An automated interactive optimization method of short keyword queries for improving information retrieval from opaque (black box) search engines, comprising:

a) collecting data including labeled claims from several fact-checking websites, for creating dataset which is used for evaluation;

b) estimating the relevance of posts/query results retrieved from a search engine to a given input document, by calculating the mean relevance error (MRE), based on estimating the minimal distance between words comprising both the retrieved posts and the input document;

c) labeling a subset of claims for evaluation, by choosing a number of claims that gained the maximal and the minimal mean relevance error (MRE); and d) finding the most appropriate queries in order to retrieve the maximal number of relevant posts using an opaque search engine, by performing an interactive greedy search for the best word that should be added to the input query, for maximizing the corresponding posts retrieved by the search engine, wherein the interactive greedy search process includes the following steps:

e) splitting the given document's text into a set of words and removing stop words;

f) in a bottom-up search, starting from queries with a single word, sending each query to the opaque search engine and receiving posts as a response;

g) receiving for each keyword an aggregated mean relevance error (MRE), which reflects the relevance of the retrieved collection of posts to the given document;

h) adding the keyword that its MRE improves the retrieved results, wherein the process is finished in case the error is not increased, or in case the query includes all the document's keywords; and i) returning and implementing the algorithm on the query that yields the best MRE.

8. A system for automated interactive keyword optimization for opaque search engines, comprising:

a) a database for storing data for evaluation, including labeled claims collected from several fact-checking websites;

b) at least one processor, adapted to:

b.1) estimate the relevance of posts/query results retrieved from a search engine to a given input document, by calculating the mean relevance error (MRE), based on estimating the minimal distance between words comprising both the retrieved posts and the input document;

b.2) label a subset of claims for evaluation, by choosing a number of claims that gained the maximal and the minimal mean relevance error (MRE); and b.3) find the most appropriate queries in order to retrieve the maximal number of relevant posts using an opaque search engine, by performing an interactive greedy search for the best word that should be added to the input query, for maximizing the corresponding posts retrieved by the search engine, wherein the interactive greedy search process includes the following steps:

c) splitting the given document's text into a set of words and removing stop words;

d) in a bottom-up search, starting from queries with a single word, sending each query to the opaque search engine and receiving posts as a response;

e) receiving for each keyword an aggregated mean relevance error (MRE), which reflects the relevance of the retrieved collection of posts to the given document;

f) adding the keyword that its MRE improves the retrieved results, wherein the process is finished in case the error is not increased, or in case the query includes all the document's keywords; and g) returning and implementing the algorithm on the query that yields the best MRE.

\* \* \* \* \*